United States Patent Office 2,784,142
Patented Mar. 5, 1957

2,784,142

PROCESS FOR THE RECOVERY OF CALLICREIN FROM ANIMAL SUBSTANCES

Fritz Schultz, Wuppertal-Sonnborn, Germany, assignor, by mesne assignments, to Farbenfabriken Bayer Aktiengesellschaft, Leverkusen-Bayerwerk, Germany No Drawing. Application August 13, 1952,
Serial No. 304,225

Claims priority, application Germany August 16, 1951

4 Claims. (Cl. 167—74)

This invention relates, generally to processes for obtaining physiologically active products from animal parts and, more particularly, it concerns an improved process for recovering callicrein from animal sources.

The circulatory hormone callicrein may be described as a hypotensive, non-crystallizable, non-dialyzable, organic constituent of human and, to a greater degree, dogs' urine, apparently a high-molecular weight protein of unknown composition, thermolabile and quickly destroyed by boiling, by acids, alkalis and oxidizing agents. It has been recommended for use in the treatment of angina pectoris and peripheral vascular disorders.

Heretofore, callicrein has been obtained by autolysis of animal blood, animal pancreas and submaxillary glands of various beasts, including hogs, cattle, cats and dogs. In these prior-art processes, the animal product processed, preferably in divided state, was allowed to autolyze in water at a temperature within the range of 20 to at most 37° C., whereby the natural ferments caused destruction of the cell structure with liberation of the callicrein bound within the cells. Temperatures within the range indicated were favored because at these temperatures optimum propagation of the lytic microorganisms took place and inactivation of the callicrein was minimized. It has long been recognized that callicrein is thermolabile, being completely inactivated by heating for even a few minutes at 65° C.

This procedure of the prior art had the disadvantage of requiring a long period for lysis of the cells, at least one to three days; of requiring additional processing of the material to remove fats and the like, such as result from treatment of animal pancreatic substances; and of causing production of bacterial toxins during the autolysis that are extremely difficult to remove from the solution at a later stage.

An object of the present invention is to provide an economical simple process for obtaining callicrein from animal substances that is free of the disadvantages of the prior art procedure mentioned above.

In accordance with this invention, the animal substance is subjected to thermolysis at a temperature within the range of about 45° C. to about 60° C., preferably at a temperature of about 55° C., whereby the destruction of the cell structure of the animal material is effected with liberation of callicrein into the solution. It is remarkable that these operations at elevated temperatures do not inactivate the callicrein, but such is the fact and the process permits a very rapid treatment of the animal substance to effect recovery of the hormone. For example, at an operating temperature of 48° C. merely one hour of treatment suffices to liberate substantially all of the hormone present in the animal substance; at 50° C., merely ten minutes is required; and, at 55° C., full recovery is effected within a few minutes, assuming that the material being processed is stirred during the period of thermolysis.

An advantage of the process of this invention, in addition to the advantage of recovering the hormone in so much shorter a processing period than heretofore was thought necessary, is that when the hormone is recovered from animal pancreatic substance, it normally contains up to 35 percent of fat, the fat melts during the processing and ascends to the surface, together with coagulated albuminous substances and fibrous substances, permitting the aqueous solution of the hormone to be withdrawn from below.

A further advantage of the process of this invention, when compared to the autolytic prior art process for obtaining callicrein is that the processing period is so brief and the processing temperature is so high that bacterial growth in the substances being processed is not favored, thus production of bacterial toxins is minimized if not substantially eliminated.

The process of this invention is preferably practiced utilizing as starting materials, hog pancreas or hog submaxillary glands. The starting material is prepared for treatment by subdividing it as by grinding or chopping, so that it may be suspended readily in water. The thermolysis is best effected in an acidic aqueous medium, preferably at a hydrogen ion concentration of approximately pH 4.6. Hydrogen ion concentrations having a pH value below 4.0 materially reduce the yield of the desired product, while alkaline media, particularly at pH values higher than 8.5, destroy most of the hormone. Thus, adjustment of the hydrogen ion concentration to not less than pH 4 to not more than pH 7 is desirable. As above mentioned, the optimum operating temperature is about 55° C.; at this temperature, the major portion of the protein flocculates while almost all the callicrein enters solution. When this operating temperature is used and the aqueous suspension of animal substance is stirred sufficiently to insure uniform distribution of heat throughout, complete thermolysis and solution of the callicrein is effected merely by raising the temperature of the mixture to about 55° C. Under these conditions, for instance, one kilogram of fresh hog pancreas, depending upon the fat content of the glands, yields 25,000 to 44,000 callicrein units. Good yields of the hormone are still obtained even though the operating temperature is raised to about 60° C. but when the operating temperature is about 65° C. or higher, active material is not recovered. After thermolysis has been completed, the insoluble components, consisting of fat, connective tissue and flocculated protein are separated from the clear aqueous callicrein solution by merely decanting or centrifuging the mixture. The product obtained by the process of this invention is a low protein callicrein solution of a relatively high degree of purity which is substantially free of bacterial toxins.

In order to facilitate a clearer understanding of the process of this invention, a specific application of the process to the treatment of hog pancreas will now be described, with the understanding that the process, of course, is not limited to the treatment of hog pancreas, but may be applied with equally satisfactory results, to other callicrein-containing animal substance previously mentioned herein.

Example

About 2 kilograms of hog pancreas, obtained from freshly slaughtered animals is finely comminuted in a meat grinder, and the ground material is introduced into 5 liters of twice-distilled water, acidified with hydrochloric acid to a hydrogen ion concentration of about pH 4.6. Provision is made for stirring the suspension while it is being heated and it is then heated, with stirring, to a temperature of 55° C., preferably on a water bath. When this temperature is reached, the mixture is transferred to a separatory funnel and allowed, briefly, to stratify. The molten fatty material rises with the fibers of the connective tissue and flocculated protein; when stratification is substantially complete, the clear aqueous callicrein solution is drained from the bottom of the separatory funnel. If desired, the hot solution may be centrifuged to effect stratification after thermolysis. The aqueous solution thus obtained contains about 70,000 units of callicrein, substantially free of undesirable proteinaceous material and pyrogens.

Having thus described the subject matter of this invention, what it is desired to secure by Letters Patent is:

1. In a process for obtaining callicrein from callicrein-containing animal glands, the improvements that comprise forming an aqueous mixture of the animal glands, adjusting the hydrogen ion concentration of the aqueous mixture to within the range of not less than pH 4 to not more than pH 7, heating the aqueous mixture for a few minutes to not longer than one hour at a temperature within the range of about 45° C. to about 60°, whereby thermolysis and separation of coagulable protein and fatty material present occurs, and separating the aqueous component from the separated fatty and proteinaceous material.

2. The process as defined in claim 1 further characterized in that the thermolysis is performed by heating and stirring the aqueous mixture for a few minutes at a temperature of about 55° C.

3. The process as defined in claim 2 further characterized in that the callicrein-containing animal substance in hog pancreas.

4. The process as defined in claim 3 further characterized in that the hydrogen ion concentration of the aqueous suspension is approximately pH 4.6.

References Cited in the file of this patent

UNITED STATES PATENTS

| | | |
|---|---|---|
| 2,069,019 | Schultz | Jan. 26, 1937 |
| 2,219,167 | Schultz | Oct. 22, 1940 |
| 2,353,016 | Daughenbaugh | July 4, 1944 |
| 2,466,487 | Scott | Apr. 5, 1949 |